(12) United States Patent
Wang et al.

(10) Patent No.: US 9,739,262 B2
(45) Date of Patent: Aug. 22, 2017

(54) STATIC TESTING AND CALIBRATING METHOD FOR PID LINK OF CONTROL SYSTEM OF WIND TURBINE

(71) Applicants: State Grid Corporation of China, Beijing (CN); Gansu Electric Power Company of State Grid, Lanzhou (CN); Wind Power Technology Center of Gansu Electric Power Company, Lanzhou (CN)

(72) Inventors: Ning-Bo Wang, Beijing (CN); Shi-Yuan Zhou, Beijing (CN); Kun Ding, Beijing (CN); Liang Lu, Beijing (CN); Jin Li, Beijing (CN); Jin-Ping Zhang, Beijing (CN); Shi-En He, Beijing (CN); Yan-Hong Ma, Beijing (CN); Ding-Mei Wang, Beijing (CN); Rong Huang, Beijing (CN)

( * ) Notice: Subject to any disclaimer, the term of this patent is extended or adjusted under 35 U.S.C. 154(b) by 259 days.

(21) Appl. No.: 14/565,443

(22) Filed: Dec. 10, 2014

(65) Prior Publication Data

US 2016/0169204 A1    Jun. 16, 2016

(51) Int. Cl.
| | | |
|---|---|---|
| *F03D 11/00* | (2006.01) | |
| *F03D 7/00* | (2006.01) | |
| *G05B 11/42* | (2006.01) | |
| *F03D 17/00* | (2016.01) | |

(52) U.S. Cl.
CPC ............ *F03D 7/00* (2013.01); *F03D 11/0091* (2013.01); *F03D 17/00* (2016.05); *G05B 11/42* (2013.01); *F05B 2260/83* (2013.01); *F05B 2270/706* (2013.01); *Y02E 10/723* (2013.01)

(58) Field of Classification Search
CPC ........ F03D 11/0091; F03D 17/00; F03D 7/00; F05B 2260/83; F05B 2270/706; G05B 11/42
See application file for complete search history.

(56) References Cited

U.S. PATENT DOCUMENTS

| | | | |
|---|---|---|---|
| 7,939,961 B1 * | 5/2011 | Bonnet | F03D 1/0608 290/44 |
| 2010/0109328 A1 * | 5/2010 | Li | H02M 7/53875 290/44 |
| 2010/0292813 A1 * | 11/2010 | Boiko | G05B 19/042 700/37 |
| 2012/0056602 A1 * | 3/2012 | Li | H02P 9/48 322/89 |
| 2012/0161442 A1 * | 6/2012 | Chapple | F03D 7/0276 290/44 |
| 2015/0370277 A1 * | 12/2015 | Britt | G05F 1/67 700/287 |

\* cited by examiner

*Primary Examiner* — Francis Gray
(74) *Attorney, Agent, or Firm* — The Law Office of Austin Bonderer, PC; Austin Bonderer

(57) ABSTRACT

A static testing and calibrating method for PID link of control system of wind turbine includes following steps. A PID control link of the PID link of the control system of wind turbine is tested. A PID regulator response characteristics is tested. The PID link of control system is calibrated by applying test results of the PID control link and the PID regulation response characteristics.

6 Claims, 4 Drawing Sheets

STATIC TESTING AND CALIBRATING METHOD FOR PID LINK OF CONTROL SYSTEM OF WIND TURBINE

BACKGROUND

1. Technical Field

The present disclosure relates to a static testing and calibrating method for PID (proportion-integration-differentiation) link of control system of wind turbine.

2. Description of the Related Art

With the rapid development of wind farm industry, the installed wind power capacity in the power network operation has reached 100 million kilowatts. The wind power output often brings a certain impact to the operation stability of the power grid.

In order to meet the challenge and solve the problem of security and stability, the power grid needs advanced technology and management measures. These are inseparable from the simulation study of wind turbines and the wind farm power system. Thus mathematical modes and accurate parameters of the wind turbine and wind farm need to be researched. However, it is not convenient and low in accuracy to test the parameters at present.

What is needed, therefore, is a static testing and calibrating method for PID link of control system of wind turbine that can overcome the above-described shortcomings.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

Figure 1:
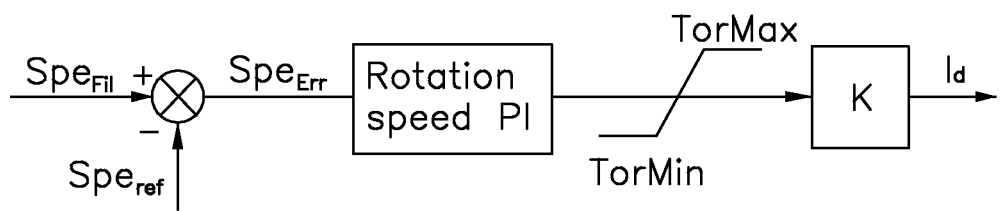
FIG. 1 shows a schematic view of one embodiment of a working principle of torque control model in a static testing and calibrating method for PID link of control system of wind turbine.

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

In order to analyze the impact of wind power on the dynamic characteristics of the power system, a dynamic mathematical model of the wind farm and the wind turbine need to be established.

Wind turbine is a complex system that contains multi-disciplinary working principle. The working principle of the wind turbine blade is based on the aerodynamics. The working principle of the transmission system is related to mechanical theory. The electromechanical energy conversion and the wind power control systems are widely involved in control theory and electrical works. Therefore, a test validation is very necessary and useful after the completion of the dynamic modeling of wind turbines.

A static testing and calibrating method for PID link of control system of wind turbine is applied to the modeling and commissioning of the wind turbine control system. The method is applied to test the PID link of the pitch angel control model, the torque control model, and the reactive power control model in the wind turbine control system (master PLC). The static testing and calibrating method for PID link of control system of wind turbine belongs to the static test range.

The method is based on time-domain test method and frequency-domain test method. In the time-domain test method, the parameters of the system model is obtained by inputting certain values into the control system, and analyzing the model structure of the control system based on the time domain representation of outputs. The method is a direct way but more accurate, and can provide all the information of the time-domain response of the system. Because the time-domain analysis analyze the system directly in the time-domain, thus the time-domain analysis is intuitive and accurate. The outputs of the system can be obtained through the differential equation or transfer function.

In the frequency-domain test method, the frequency-domain analysis takes frequency as independent variable, the signal value of each frequency component (power value or energy value) as the dependent variable. The spectrum analyzer can analyze the signal, and nonlinear distortion coefficient of linear system. The harmonic components of the signal can be determined, and the spectrum occupancy of signal ban be recognized. The frequency-domain test method adopts multi-frequency signal as the test signals, and utilize white noise signal as the test signals.

Referring to FIGS. 1-4, the static testing and calibrating method for PID link of control system of wind turbine comprises:

a1, testing the PID control link;
a2, testing the PID regulator response characteristics; and
a3, applying the test result of the PID control link and the PID regulation response characteristics.

In step a1, the PID control link test comprises:
a11, torque control PID test;
a12, reactive power control PID test; and
a13, pitch angel control PID test.

In step a11, a torque control link of fans controls the active power of the wind turbine. Referring to FIG. 1, the input of the torque control link is speed deviation (actual speed of engine-rotation speed reference value of the generator). The master control link is the proportion+integral (PI) controller. The PI output passes through a limiting altitude link of a maximum torque $Tor_{max}$ and a minimum torque $Tor_{min}$. The final output is a given active current $I_d$. The final output is transferred to the main frequency converter (not shown) to carry out active control.

The relative parameters and variables are listed:
$Spe_{Fil}$: measured generator rotation speed after filtered;
$Spe_{ref}$: rotation speed reference value;
$Spe_{Err}$: speed deviation between the measured rotation speed and the rotation speed reference value;
KP: torque control proportion coefficient;
KI: torque control integral coefficient;

Tor$_{max}$: maximum torque;
Tor$_{min}$: minimum torque;
I$_d$: given active current.

Figure 2:
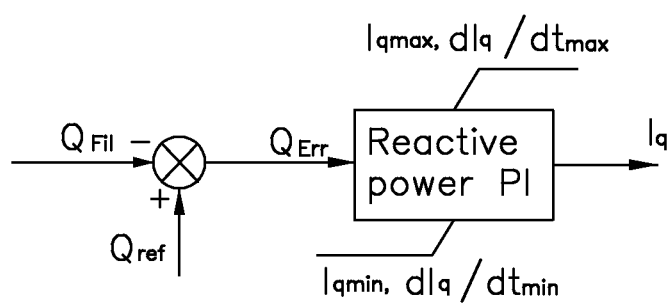
FIG. 2 shows a schematic view of one embodiment of a working principle of excitation control model in a static testing and calibrating method for PID link of control system of wind turbine.

In step a12, a reactive power control link of fans controls the reactive power of the wind turbine. Referring to FIG. 2, the reactive power instruction is input into the models through a open-loop control logic. The open-loop control logic perform reactive power compensation for the reactive power of the wind turbine and pre-fabricated substation based on the output active power and reactive power, ensuring that a power factor on the side of high voltage of the pre-fabricated substation is about 1.

The reactive power control PID test focuses on the closed-loop control link after the open-loop control logic generates the reactive power instruction. The input of the reactive power control link is reactive power deviation (measured reactive power-reactive power reference value). The master control link is PI controller. The PI output passes through a first limiting link of a maximum reactive current I$_{qmax}$ and a minimum reactive current I$_{qmin}$, and a second limiting link of a maximum reactive current variety dI$_q$/d$_{tmax}$ and a minimum reactive current variety dI$_q$/d$_{tmin}$. The final output is a given reactive current I$_q$. The final output is transferred to the main frequency converter (not shown) to carry out reactive control.

The relative parameters and variables are listed:
QPP: measured reactive power
Q$_{Fil}$: reactive power after filtered;
Q$_{ref}$: reactive power reference value;
Q$_{Err}$: speed deviation between the measured reactive power and reactive power reference value;
KPQ: reactive power control proportion coefficient;
KIQ: reactive power control integral coefficient;
I$_{qmax}$: maximum reactive power current;
I$_{qmin}$: minimum reactive power current.

Figure 3:
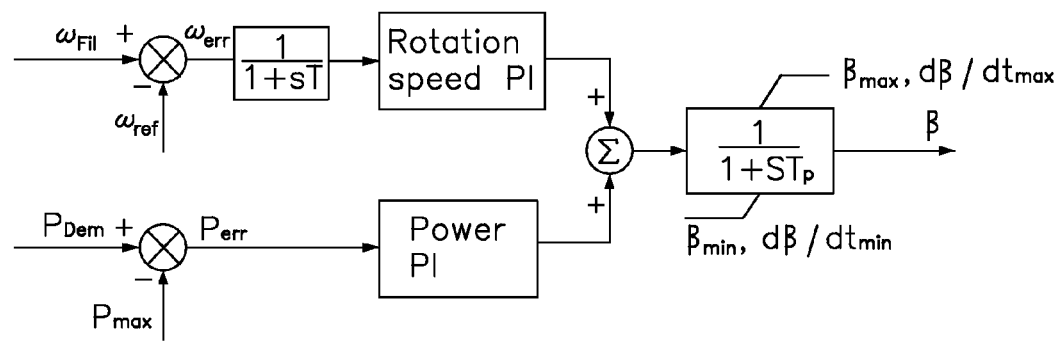
FIG. 3 shows a schematic view of one embodiment of a working principle of pitch angle control in a static testing and calibrating method for PID link of control system of wind turbine.
Figure 4:
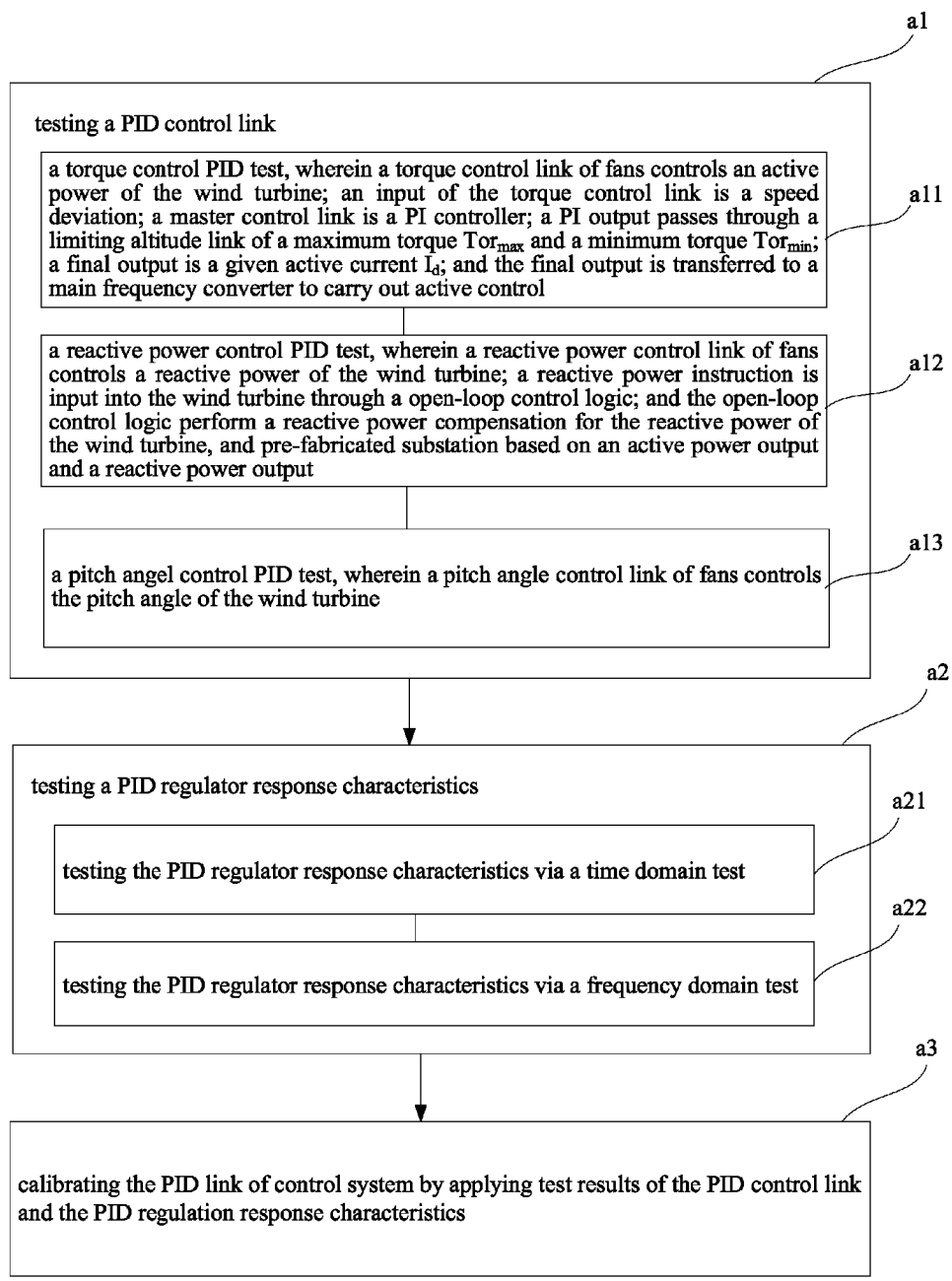
FIG. 4 shows a flowchart of one embodiment of a static testing and calibrating method for PID link of control system of wind turbine.

In step a13, a pitch angle control link of fans controls the pitch angle of the wind turbine. Referring to FIG. 3, the pitch angle control link comprises two PI control logics: rotation speed channel PI control and active power channel PI control.

The input of the rotation speed channel control link is rotation speed deviation (measured angular velocity of engine-angular velocity reference value of generator). The master control link is proportional and integral PI controller.

The input of the active power channel control link is active power deviation (active power instruction-maximum active power P$_{max}$ can be issued at this time). The master control link is proportional and integral PI controller. Furthermore, the value of P$_{max}$ can be calculated based on various conditions such as wind speed. Due to rapidity of control, the P$_{max}$ is adopted instead of the actual active power P because the variety of actual active control is slower than that of the P$_{max}$.

A pitch speed instruction is generated by summing the output of the PI control of rotation speed channel control link and the active power channel control link. A pitch angle instruction is generated after the pitch speed instruction passing through a first limiting link of a maximum pitch angle β$_{max}$ and a minimum pitch angle β$_{max}$, and a second limiting link of a maximum pitch angle variety dβ/dt$_{max}$ and a minimum pitch angle variety dI$_q$/dt$_{min}$. The pitch angle instruction is transferred to a pitch actuator system to achieve the control of the pitch variety.

The parameters and variables are listed:
ω$_{Fil}$: angular speed of generator after filtered;
ω$_{ref}$: angular speed reference value;
ω$_{err}$: speed deviation between the angular speed reference value and the actual angular speed;
ω$_{errold}$: the angular velocity deviation of a sampling point;
K$_{Iω}$: proportion coefficient of speed link;
K$_{Pω}$: integral coefficient of speed link;
P$_{Dem}$: active power instruction;
P$_{max}$: maximum active power;
P$_{err}$: deviation between the active power instruction and the maximum active power;
P$_{errold}$: the active power deviation of a sampling point;
β$_{max}$: maximum pitch angle;
β$_{min}$: minimum pitch angle.

In step a2, the PID regulator response characteristics test comprises:

a21, testing the PID regulator response characteristics via a time domain test; and a22, testing the PID regulator response characteristics via a frequency domain test.

In step (a21), the time domain test comprises:

a211, selecting one link of the wind turbine control system (power control system, voltage or reactive power control system, and variable pitch control system) and carrying out the time domain test;

a212, carrying out a step test via changing the input signal before the testing link (PID), wherein the output is taken to identify various PID parameters;

a213, changing the various PID parameter by taking different combinations of PID parameters and repeating step a212.

In step a211, while measuring the proportional magnification, the differential and integral link quit. While measuring the integral coefficient, the proportional and differential link quit. While measuring the differential link, the proportional and integral link quit.

In step a22, the frequency domain test comprises:

a221, selecting one link of the wind turbine control system (power control system, voltage or reactive power control system, and variable pitch control system) and carrying out the frequency domain test;

a222, introducing white noise signal before the input of PID, outputting feedback into the spectrum analyzer, enlarging the white noise signal, and carrying out frequency domain test to record characteristics of amplitude-frequency and phase frequency;

a223, changing the various PID parameters by taking different combinations of PID parameters and repeating step a222;

a224, introducing white noise signal before the input of measure link, outputting feedback into the spectrum analyzer, enlarging the white noise signal, and carrying out frequency domain test to record characteristics of amplitude-frequency and phase frequency; and a225, introducing white noise signal before the input of delay link, outputting feedback into the spectrum analyzer, enlarging the white noise signal, and carrying out frequency domain test to record characteristics of amplitude-frequency and phase frequency.

In step a221, while measuring the proportional magnification, the differential and integral link quit. While measuring the integral coefficient, the proportional and differential link quit. While measuring the differential link, the proportional and integral link quit.

The step a3 comprises:

a31, torque control PID test;

a32, reactive power control PID test; and a33, pitch angle control PID test.

In step a31, in the torque control PID test, the software and hardware of the master PLC can be modified before carry out the test, thus it is convenient for applying disturbance to the measuring link and sampling and recording waveform of the input of PID (PID IN) and the output of PID (PID OUT). Table 1 is listed:

TABLE 1

The software and hardware modification of torque control model in master PLC

| Signal | Range | Output | Ratio |
|---|---|---|---|
| PID IN | −540 rpm~540 rpm | −10~10 V | 54 |
| PID OUT | −100%~100% | −10~10 V | 10 |

Rotation speed reference value: 1800 rpm

In one embodiment, a typical parameters computational design is shown below:
A. proportional link test:
Test 1: $K_p=1$, $K_i=0$.
Test 2: Kp=2, Ki=0.
B. integral link test:
Test 1: $K_p=1$, $K_i=1$.
Test 2: Kp=2, Ki=3.

In step a32, in the reactive power control PID test, the software and hardware of the master PLC can be modified before carry out the test, thus it is convenient for applying disturbance to the measuring link and sampling and recording waveform of the input of PID (PID IN) and the output of PID (PID OUT). Table 2 is listed:

TABLE 2

The software and hardware modification of reactive power control model in master PLC

| Signal | Range | Output | Ratio |
|---|---|---|---|
| PID IN | −500 kVar~500 kVar | −10~10 V | 50 |
| PID OUT | −100%~100% | −10~10 V | 10 |

Reactive power reference value: 500 kVar

In one embodiment, a typical parameters computational design is shown below:
A. proportional link test:
Test 1: $K_p=1$, $K_i=0$.
Test 2: Kp=2, Ki=0.
B. integral link test:
Test 1: $K_p=1$, $K_i=2$.
Test 2: Kp=1, Ki=3.
Test 3: Kp=5, Ki=3.

In step a33, in the pitch angle control PID test, the software and hardware of the master PLC can be modified before carry out the test, thus it is convenient for applying disturbance to the measuring link and sampling and recording waveform of the input of PID (PID IN) and the output of PID (PID OUT). Table 3 is listed:

TABLE 3

The software and hardware modification of pitch angle control model in master PLC

| Signal | Range | Output | Ratio |
|---|---|---|---|
| Rotation speed channel PID IN | −540 rpm~540 rpm | −10~10 V | 54 |
| Rotation speed channel PID OUT | −100%~100% | −10~10 V | 10 |
| Rotation speed reference value: 1800 rpm | | | |
| Active power channel PID IN | −1500 kW~1500 kW | −10~10 V | 150 |
| Active power channel PID OUT | −100%~100% | −10~10 V | 10 |
| Active power reference value: 1500 kW | | | |

In one embodiment, atypical parameters computational design is shown below:
A. rotation speed channel PID test
(a) proportional link test:
Test 1: T=0, $K_p=1$, $K_i=0$.
Test 2: T=0, Kp=3, Ki=0.
(b) integral link test:
Test 1: T=0, $K_p=1$, $K_i=2$.
Test 2: T=0, Kp=1, Ki=3.
Test 3: T=0, Kp=5, Ki=2.
(c) a first order inertia link test:
Test 1: T=25, $K_p=1$, $K_i=0$.
Test 2: T=200, Kp=3, Ki=0.
B. active power channel PID test
(a) proportional link test:
Test 1: $K_p=1$, $K_i=0$.
Test 2: Kp=3, Ki=0.
(b) integral link test:
Test 1: $K_p=1$, $K_i=3$.
Test 2: Kp=10, Ki=3.

The static testing and calibrating method for PID link of control system of wind turbine has following advantages. The method is based on time-domain theory and frequency-domain theory. The key parameters can be obtained through the static testing and calibrating method for PID link of control system of wind turbine, and the correctness of the wind turbine model. The inconvenient and low in accuracy can be overcome. The static testing and calibrating method for PID link of control system of wind turbine is convenient for testing and high in accuracy.

Depending on the embodiment, certain of the steps of methods described may be removed, others may be added, and that order of steps may be altered. It is also to be understood that the description and the claims drawn to a method may include some indication in reference to certain steps. However, the indication used is only to be viewed for identification purposes and not as a suggestion as to an order for the steps.

It is to be understood that the above-described embodiments are intended to illustrate rather than limit the disclosure. Variations may be made to the embodiments without departing from the spirit of the disclosure as claimed. It is understood that any element of any one embodiment is considered to be disclosed to be incorporated with any other embodiment. The above-described embodiments illustrate the scope of the disclosure but do not restrict the scope of the disclosure.

What is claimed is:
1. A static testing and calibrating method for PID link of control system of wind turbine, the method comprising:
testing a PID control link, wherein the testing the PID control link comprises:
a torque control PID test, wherein a torque control link of fans controls an active power of the wind turbine;

an input of the torque control link is a speed deviation; a master control link is a PI controller; a PI output passes through a limiting altitude link of a maximum torque $\text{Tor}_{max}$ and a minimum torque $\text{Tor}_{min}$; a final output is a given active current $I_d$; and the final output is transferred to a main frequency converter to carry out active control;

a reactive power control PID test, wherein a reactive power control link of fans controls a reactive power of the wind turbine; a reactive power instruction is input into the wind turbine through a open-loop control logic; and the open-loop control logic perform a reactive power compensation for the reactive power of the wind turbine, and pre-fabricated substation based on an active power output and a reactive power output; and a pitch angel control PID test, wherein a pitch angle control link of fans controls the pitch angle of the wind turbine;

testing a PID regulator response characteristics, wherein the testing the PID regulator response characteristics comprises:

testing the PID regulator response characteristics via a time domain test; and testing the PID regulator response characteristics via a frequency domain test; and calibrating the PID link of control system by applying test results of the PID control link and the PID regulation response characteristics.

2. The method of claim 1, wherein the pitch angle control link comprises two PI control logics: rotation speed channel PI control and active power channel PI control.

3. The method of claim 1, wherein the testing the PID regulator response characteristics via the time domain test comprises:

selecting one PID link of the control system of the wind turbine and carrying out the time domain test;

carrying out a step test via changing input signals before testing link of PID, wherein outputs are taken to identify various PID parameters; and changing the various PID parameter by inputting different combinations of PID parameters and repeating step of carrying out the step test.

4. The method of claim 3, wherein the control system comprises a power control system, a voltage or reactive power control system, and a variable pitch control system.

5. The method of claim 4, wherein the frequency domain test comprises:

selecting one PID link of the control system and carrying out the frequency domain test;

introducing a white noise signal before an input of PID, outputting feedback into a spectrum analyzer, enlarging the white noise signal, and carrying out the frequency domain test to record characteristics of amplitude-frequency and phase frequency;

changing various PID parameters by taking different combinations of PID parameters and repeating the frequency domain test to record characteristics of amplitude-frequency and phase frequency;

introducing the white noise signal before an input of measure link, outputting feedback into the spectrum analyzer, enlarging the white noise signal, and carrying out the frequency domain test to record characteristics of amplitude-frequency and phase frequency; and introducing the white noise signal before an input of delay link, outputting feedback into the spectrum analyzer, enlarging the white noise signal, and carrying out the frequency domain test to record characteristics of amplitude-frequency and phase frequency.

6. The method of claim 1, wherein a typical parameters computational design in the pitch angle control PID test comprises:

a rotation speed channel PID test comprising:
a first proportional link test;
a first integral link test;
a first order inertia link test;

an active power channel PID test comprising:
a second proportional link test;
a second integral link test.

* * * * *